Jan. 1, 1935.  G. C. COIL  1,986,185
PRINTING ODOMETER
Filed April 12, 1933    4 Sheets-Sheet 1
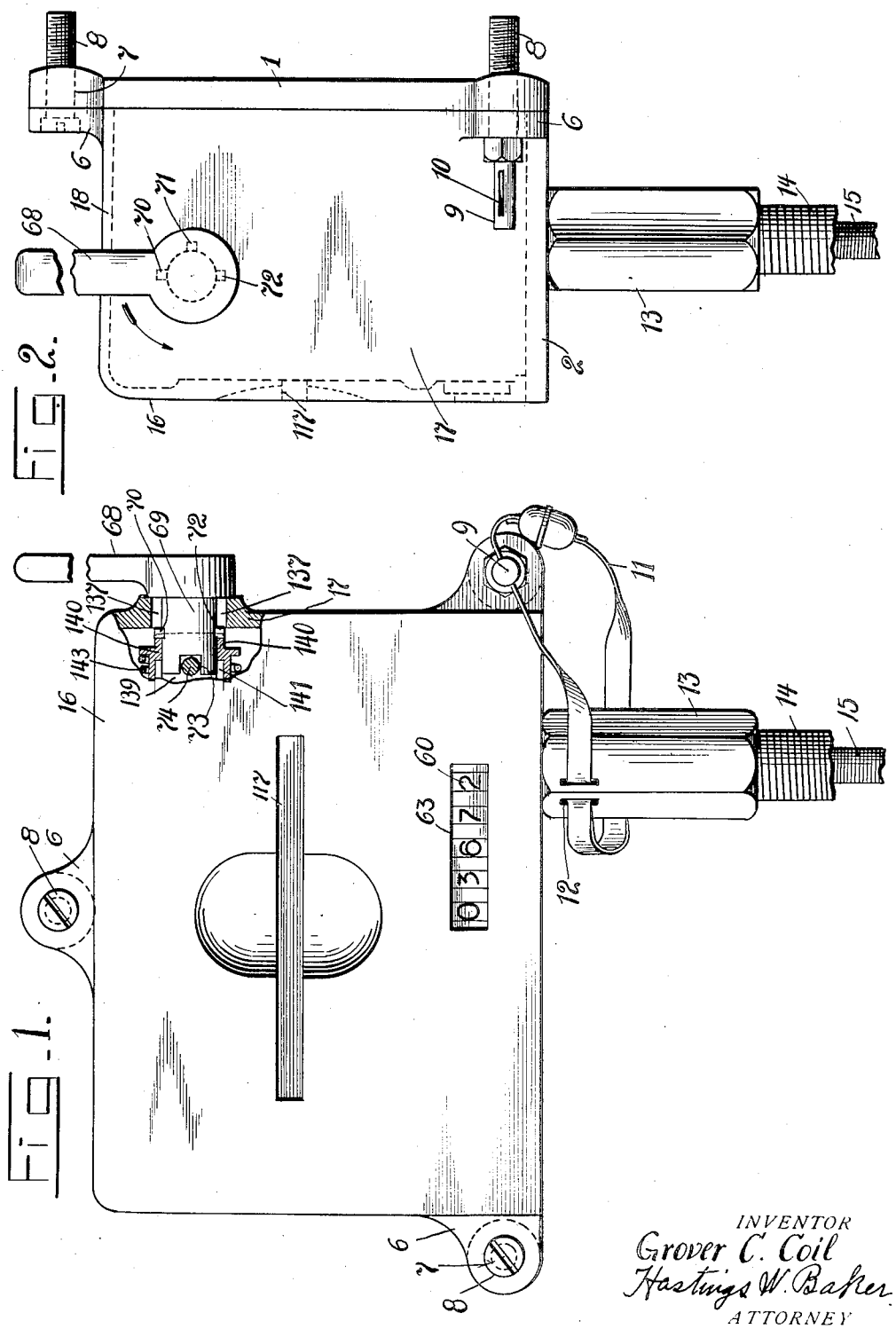
INVENTOR
Grover C. Coil
Hastings W. Baker
ATTORNEY

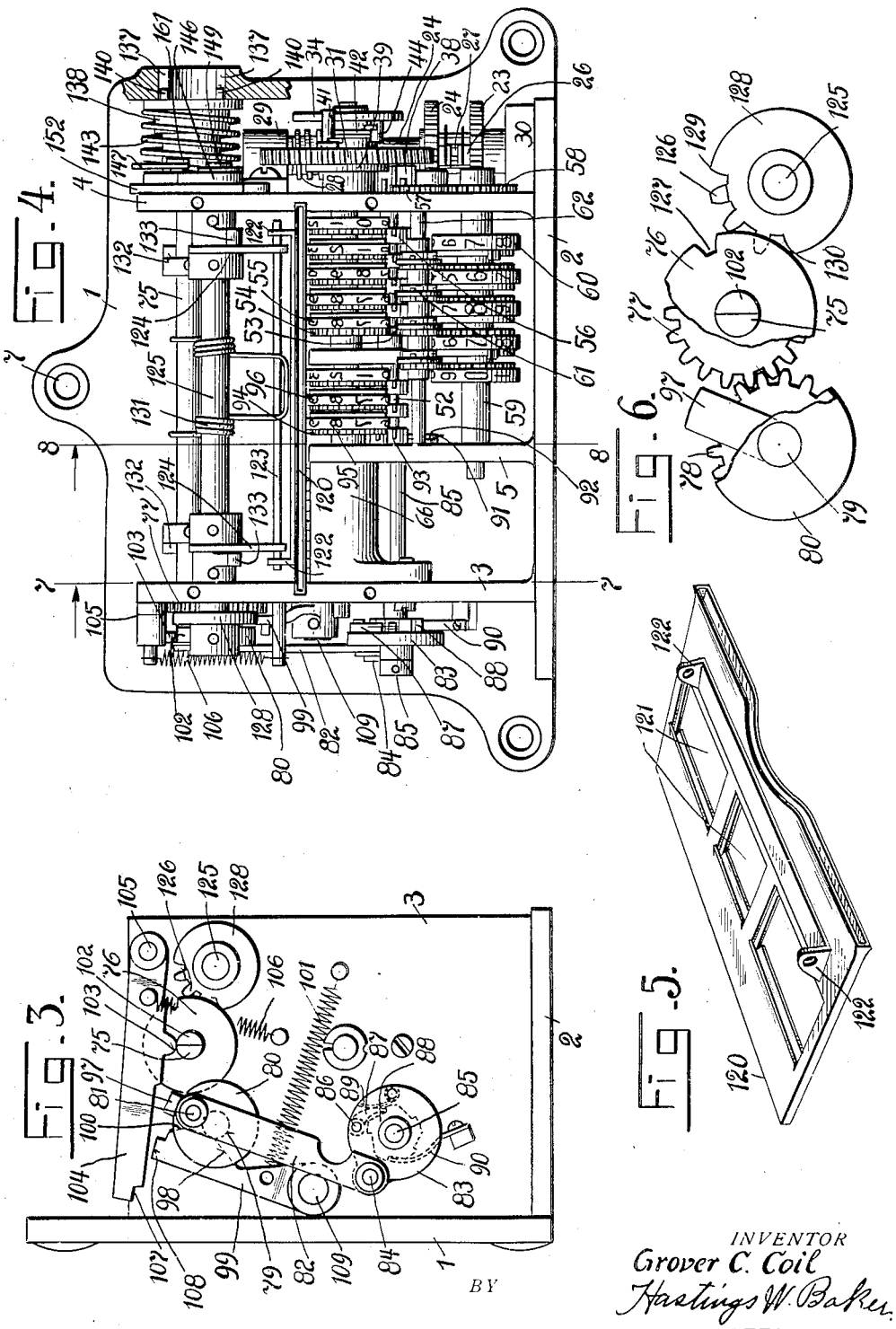

Jan. 1, 1935.　　　　　G. C. COIL　　　　　1,986,185
PRINTING ODOMETER
Filed April 12, 1933　　4 Sheets-Sheet 3
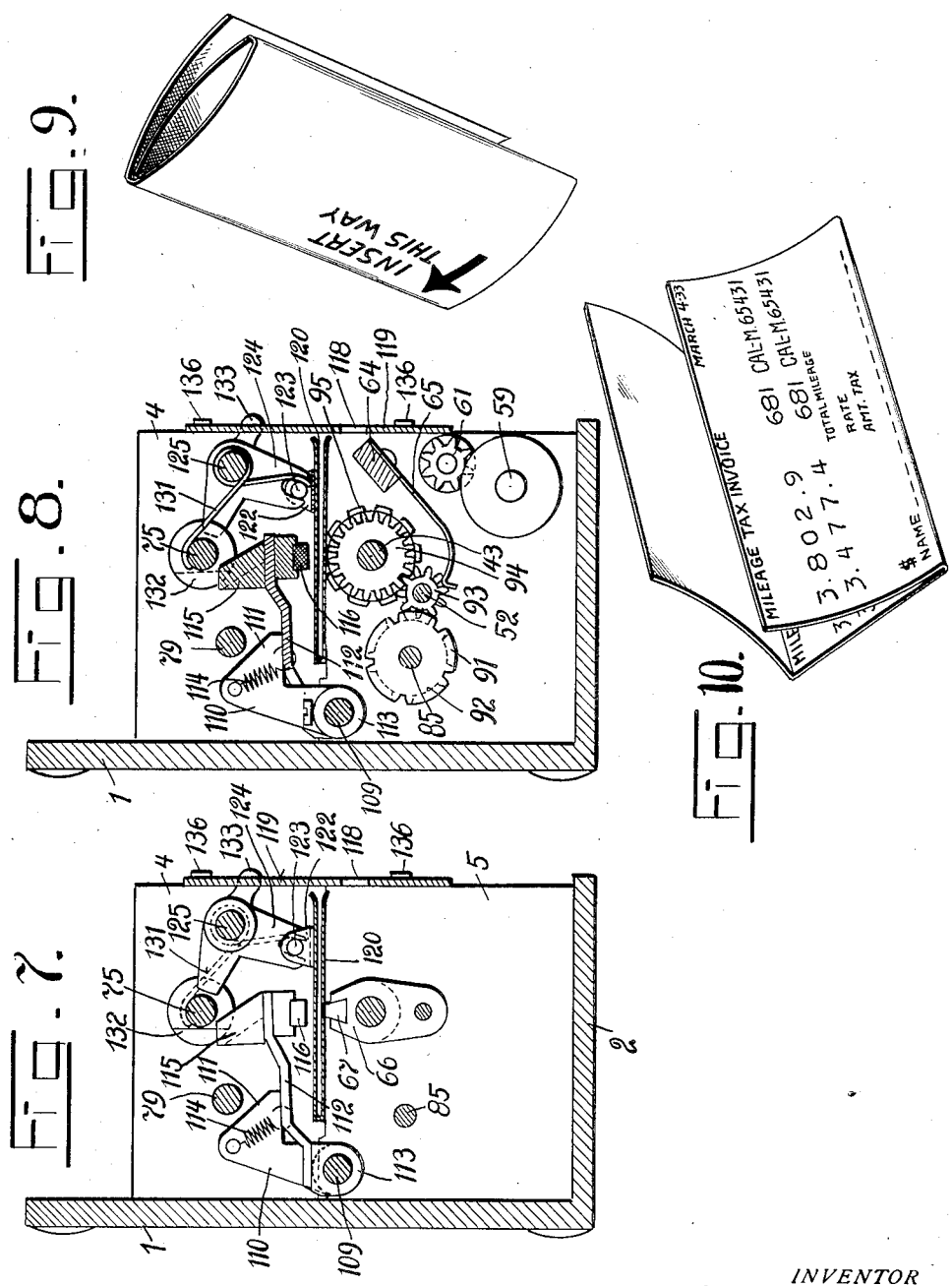
INVENTOR
Grover C. Coil
Hastings W. Baker
BY　　　ATTORNEY Jan. 1, 1935.  G. C. COIL  1,986,185
PRINTING ODOMETER
Filed April 12, 1933  4 Sheets-Sheet 4
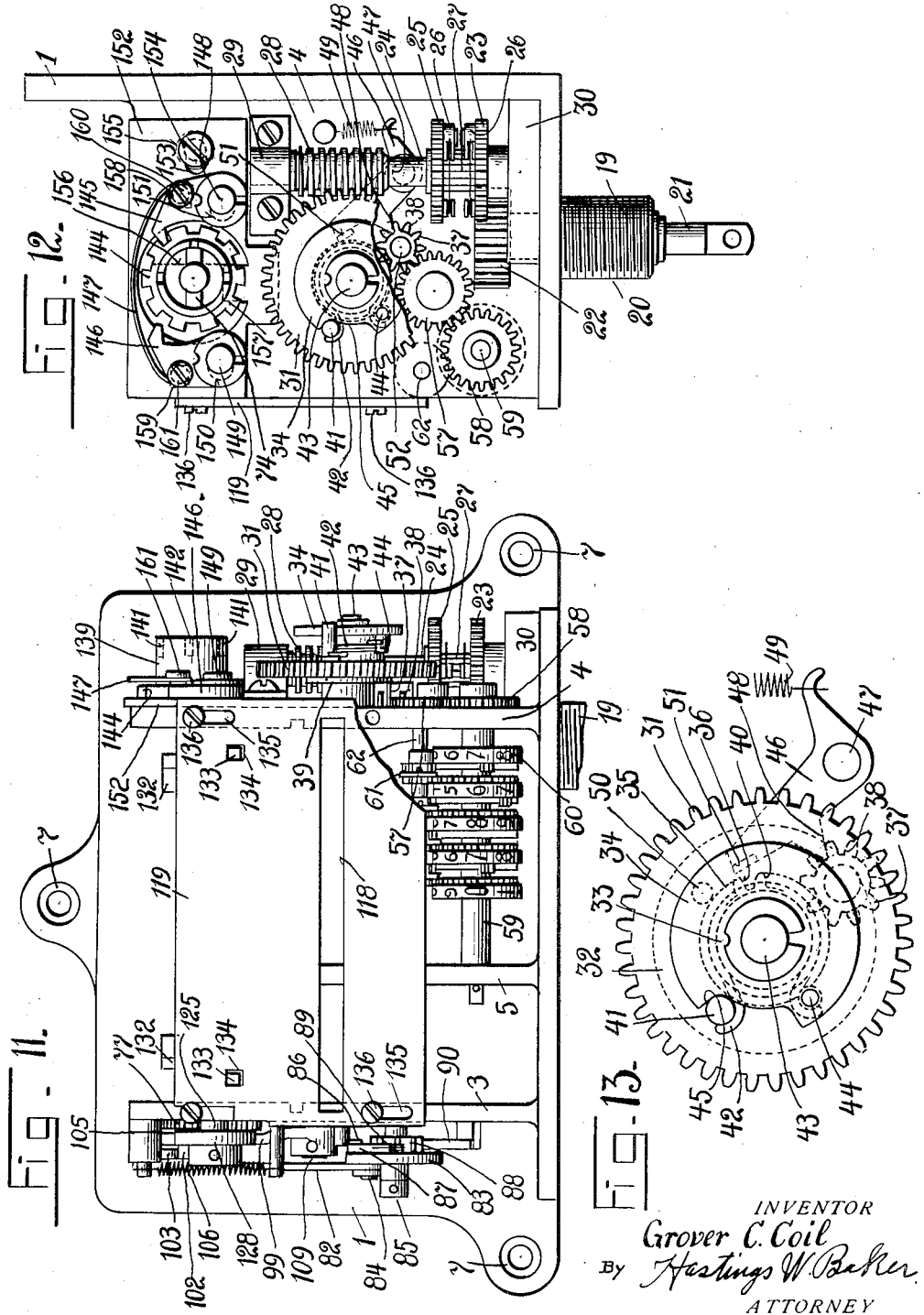
INVENTOR
Grover C. Coil
By Hastings W. Baker
ATTORNEY Patented Jan. 1, 1935

1,986,185

UNITED STATES PATENT OFFICE 1,986,185

PRINTING ODOMETER

Grover C. Coil, Dayton, Ohio, assignor, by mesne assignments, to Central United National Bank, Cleveland, Ohio, as trustee Application April 12, 1933, Serial No. 665,668

5 Claims. (Cl. 101—66)

This invention is an improvement of the structure shown in my application for printing odometer, Serial No. 635,977, filed October 3, 1932.

This invention relates to a printing odometer and is peculiarly adapted to use in connection with trucks, buses and other vehicles against which a tax is assessed on the basis of the number of miles traveled. For instance, if a State has a law taxing vehicles on the basis of mileage traveled, it is virtually essential that this mileage should be recorded. It is practically impossible for the State to provide a sufficient number of auditors who would periodically inspect every vehicle in the State subject to the tax and read from a visual odometer the present mileage, from which mileage they would subtract the mileage recorded at the time of the last inspection. It is the object of this invention to eliminate the necessity of the State or other taxing authorities having to resort to inspectors. I have, therefore, provided a printing odometer on which a ticket or card board may be inserted and an opening impression made thereon showing the mileage which the vehicle had traveled up to the time said impression was made. In line with the mileage printed is other indicia to show the number of tickets which had previously been printed and the serial number of the particular instrument. I have also provided means to render inaccessible this card board until the closing impression is made, which closing impression would be made immediately above the opening impression. This affords a simple means for the owner of the vehicle to ascertain the mileage traveled by subtracting the opening mileage from the closing mileage. From this data he can easily ascertain the amount of a tax by multiplying the number of miles traveled during the taxing period by the unit rate per mile for his particular vehicle. If now he would attach his check in payment for the amount due and forward this to the taxing authorities, it would eliminate the necessity of inspectors and would also eliminate the necessity of the State having to compute the tax and mail a bill to the taxpayer.

I realize that a dishonest owner might attempt to defraud the State of the tax due it by driving the vehicle without a card inserted in the printing odometer. His attempted fraud, however, would not be successful for when he later inserted a card and took the opening impression thereon it would not agree with the closing impression on the last card which he sent to the taxing authorities. The authorities would, therefore, know that not only had he attempted to defraud but they would know the exact number of miles he had driven the vehicle without a card being inserted. This would be a simple matter for the taxing authorities to handle, for instance, by pasting each of the cards sent in on a ledger sheet immediately beneath the last preceding card.

It is realized that one of these cards might occasionally get lost in the mail but that would present no serious problem. If, for instance, the cards are to be sent in monthly if the closing mileage impression on the January card showed 1633 and the February card was lost but the opening impression on the March card showed 2369, the taxing authorities know that the February card would have shown the difference between the closing impression on the January card and the opening impression on the March card, or 736.

I realize that some fraudulently inclined person might be inclined to attempt to remove one of the cards after it had been inserted. To this end, I lock the card within the machine until the closing impression has been made.

The casing is made water-proof and dust-proof. The casing cannot be removed without breaking a seal. The working parts cannot be reached by an instrument such as a screw driver, wire, or other instrument that might be used for the purpose of rendering the printing odometer inoperative.

I realize that a fraudulently inclined person might attempt to place the printing handle in such a position so that the printed impression would be taken, that is, so that the platen would be in engagement with the printing wheels, in an attempt to lock the printing wheels against rotation. I have, therefore, provided an impulse printing mechanism which eliminates the possibility of any success if a person should attempt to defraud as above indicated.

I have also provided a novel operating means for the units counter so that this counter will be practically instantaneously moved from one position to the next succeeding one. This is very necessary for otherwise the printing characters might be in between 6 and 7 when the printing mechanism was operated with the result that it would be impossible to tell what the units counter registered. By the mechanism which I have provided this would be impossible.

Among other points of novelty might be mentioned a new and improved full stroke mechanism and a new and improved consecutive counter.

Other objects and advantages will appear in the detailed specification and claims which follow.

In the drawings:

Fig. 1 is a front elevational view of the printing odometer with a portion of the casing partly broken away.

Fig. 2 is a side elevational view thereof.

Fig. 3 is an elevational view of the left-hand end of the machine as viewed in Fig. 4.

Fig. 4 is a front elevational view of the machine with the casing removed.

Fig. 5 is a perspective view of the ticket or card holding means.

Fig. 6 is an enlarged detailed view of a part of the mechanism shown in the upper part of Fig. 3, certain of the parts being broken away.

Fig. 7 is an elevational view, partly in cross-section, on the line 7—7 of Fig. 4, looking in the direction of the arrow.

Fig. 8 is an elevational view partly in cross-section taken on the line 8—8 of Fig. 4, looking in the direction of the arrow.

Figs. 9 and 10 are perspective views of the ticket.

Fig. 11 is a view similar to Fig. 4 but showing the shutter.

Fig. 12 is a side elevational view of the parts mounted on the right hand plate.

Fig. 13 is an elevational view of the impulse actuator for the units mileage wheel.

The housing for the instrument consists of a back plate 1 which is integral with a bottom plate 2 and with a left-hand plate 3, a right-hand plate 4, and an intermediate plate 5. The back plate 1 is provided with three ears 6 provided with bolt holes 7 adapted to receive bolts 8. As shown in Figs. 1 and 2, the lower right-hand bolt 8 is provided with an extension 9 which has a slot 10 extending therethrough adapted to receive a seal 11, which seal also extends through a slot 12 in a hexagonal nut 13 secured to the upper end of a flexible sheath 14 which houses a flexible cable 15. The lower end of the flexible cable 15 is connected to a movable part of the vehicle such as the transmission outlet and is rotated by the movement of the vehicle. A cover is provided which consists of a front plate 16, side plates 17 and a top 18. The top plate and side plates are provided with ears identical in shape with the ears of the back plate 1 and the bolts pass through both the ears of the cover and of the back plate. It is, therefore, impossible to move the cover unless we take out the bolts 8 and it is impossible to take out the lower right-hand bolt 8 without breaking the seal 11. The bolts 8, of course, are screwed into a fixed support such as the dash of the automobile. It is, therefore, impossible to remove the cover plate or to disconnect the instrument from the dash or to disconnect the hexagonal nut 13 from the instrument unless the seal 11 is broken. It is, of course, understood that the nut 13 is provided with internal threads which are screwed on to the threads 19 of a boss 20 integral with the bottom plate 2 of the casing.

The upper end of the flexible cable 15 is secured to a spindle 21 which is journaled in the boss 20 and is provided at its upper end with a gear 22 which meshes with and drives a pinion 23 mounted on a shaft 24. The gear 22 also meshes with and drives another pinion which is not shown which drives a pinion 25 in an opposite direction to the direction of rotation of the pinion 23. This gearing is not shown for the reason that it is well understood in the art that if the pinions 23 and 25 are rotated in reverse directions and each are provided with pawls 26 which engage the ratchet 27, the shaft 24 will be driven in one direction regardless of whether the vehicle is driven forward or backward. All of these pinions are of the same size so that for every revolution of the shaft 21 regardless of whether that shaft is driven forwardly or backwardly, it will drive the shaft 24 one revolution forward.

Forming a part of the shaft 24 is a worm 28 and immediately above the worm 28 is a bearing 29 for the shaft 24. The lower end of the shaft 24 is mounted in the bearing 30. These two bearings prevent longitudinal movement of the said shaft.

The worm 28 meshes with and drives a gear 31, the gear ratio being such that the gear 31 will be driven one complete revolution for each mile that the vehicle travels. Of course this gearing ratio could be changed so that the gear 31 would make one revolution for each kilometer or other unit of distance traveled. The gear 31 is integral with a disk 32 rotatably mounted on a sleeve 33. The sleeve 33 is integral with a disk 34 and a disk 35. The disks 34 and 35 are on opposite sides of the gear 31. The disk 35 is provided with a valley 36 adapted to receive one of the teeth of a five-toothed pinion 37 which is integral with a ten-toothed pinion 38. The disk 35 is also provided with a plate 39 which has two teeth 40 which when the plate 34 has been rotated one revolution will engage one of the teeth of the ten-toothed pinion 38. Normally the two teeth of the five-toothed pinion 37 nearest to the disk 35 ride on the periphery thereof, which locks the pinions 37 and 38 against rotation. When, however, the disk 35 has been rotated to the point where the teeth 40 engage a tooth of the ten-toothed pinion 38 the valley 36 of the disk 35 will be in a position to receive one of the five teeth of the five-toothed pinion 37 so that the pinions 37 and 38 will rotate one-fifth of a revolution.

I desire this rotation of the pinions 37 and 38 to be done as quickly as possible and to this end I have provided the following mechanism. The disk 32 is provided with a stud 41 which receives one end of a spring 42 which is wound about the sleeve 33 which is rotatably mounted on the shaft 43 and has its other end anchored on a stud 44 carried by the disk 34. Obviously, all of the parts mounted on the shaft 43 would tend to rotate together but if the disk 34 and parts integral therewith were stopped, the gear 31 would be permitted to continue to rotate until the stud 41 has moved from the upper end of the depression 45, shown in Fig. 13, which depression is in the disk 34 to the lower end thereof as viewed in said figure, which movement would be against the tension of the spring 42. In order to accomplish this, I have provided a pawl 46 mounted on a stud 47, which pawl has a locking nose 48 which engages the teeth of the pinion 38, the said pawl being urged in a counter-clockwise direction as viewed in Figs. 12 and 13 by means of a spring 49. When, therefore, the valley 36 receives one of the teeth of the pinion 37 and the teeth 40 engage one of the teeth of the pinion 38 there is a tendency to rotate the pinions 37 and 38 but these pinions are locked against rotation by means of the locking nose 48 carried by the pawl 46. This locks the disk 34 and parts integral therewith against rotation but the worm 28 continues to drive the gear 31 so that the stud 41 travels from the upper end of the depression 45 shown in Fig. 13 to the lower end thereof, as viewed in said figure and against the tension of the spring 42. Just before the stud 41 reaches the lower end of said depression as viewed in Fig. 13 a stud 50 carried by the disk 32 which is integral with the gear 31 engages an offset 51 carried by the end of the pawl 46 remote from the spring 49, thereby rotating the pawl 46 clockwise as viewed in Fig. 13 and raising the locking nose 48 out of engagement with the teeth of the pinion 38. The spring 42 now snaps the stud 41 back into the position shown in Fig. 13, thereby quickly and almost instantaneously rotating the pinions 37 and 38 one-fifth of a revolution. Immediately thereafter the stud 50 passes beyond the offset 51 and the spring 49 moves the locking nose 48 into engagement with the pinion 38. It, therefore, appears that this pinion is positively held against rotation until the end of the unit of distance has been reached, such as a mile, that it is then rotated quickly one-fifth of a revolution and immediately thereafter again locked against any rotation.

The pinions 37 and 38 are secured to a shaft 52 (Figs. 4, 12 and 13), which shaft also has secured thereto a pinion 53 which meshes with and drives a pinion 54 secured to the units wheel 55 of a mileage counter. The pinion 54 is of twice the size of the pinion 53 so that when the pinion 53 makes one quick rotation of one-fifth of a revolution as heretofore described the pinion 54 and the units mileage wheel 55 will make one-tenth of a revolution, which corresponds to one mile. The units mileage wheel is connected to the mileage wheels of higher denomination by the usual transfer mechanism 56.

The pinion 38 also meshes with and drives a pinion 57 which is twice the size of the pinion 38 so that when the pinion 38 quickly makes its one-fifth of a revolution the pinion 57 quickly makes one-tenth of a revolution. The pinion 57 meshes with and drives a pinion 58 secured to a shaft 59 to which is secured a units mileage wheel 60. The units mileage wheel 60 is connected to the mileage wheels of higher denomination by the means of usual transfer mechanism 61 mounted on a shaft 62.

It is apparent that the units mileage wheels 54 and 60 are, therefore, directly geared together, or at least both of the units mileage wheels are positively connected with the pinions 37 and 38 which are integral. It is, therefore, impossible that mileage wheels would show different numerals. From an inspection of Fig. 4 it is apparent that the units mileage wheel 55 is at the left-hand end of its bank of printing wheels while the mileage wheel 60 is at the right-hand end of its bank of mileage wheels. This is true because the lower banks are intended to be read through the sight-opening 63 in the front plate 16, whereas the bank of wheels, of which the unit wheel 55 forms a part, are printing wheels and the printed impression will be taken from the uppermost part thereof. The upper bank will be hereinafter referred to as recording mileage wheels, while the lower bank will be referred to as the visual mileage wheels.

In order to properly line up the printing mileage wheels I have provided a block 64 secured to a fixed part of the machine, to which block are secured spring arms 65 which normally rest between the teeth of the transfer pinions. This structure is well-known in the art.

It is, of course, necessary to identify the printed record which will be taken in the form of tickets shown in Figs. 9 and 10 with the number of the instrument. For instance, the printed ticket shown in Fig. 10 shows that the number of the machine is "Cal-M 65431" the "Cal", of course, referring to the State of California. These printing type are never changed and are mounted on a block 66 secured to the plates 3 and 5, the printing type 67 being mounted in the top of the block, as shown in Fig. 7.

I also desire to show the serial number of the ticket which, as shown in Fig. 10 is "681". Two printed impressions are shown on the ticket in Fig. 10 and both of these have the same serial number. This serial number is advanced as follows. A handle 68 is provided with a short shaft 69 which has three lugs 70, 71 and 72. It is also provided with a diametrically extending groove 73 which receives a pin 74 carried by a shaft 75. The handle 68 is in a position rotated 180 degrees from that shown in Fig. 2 when the ticket is to be inserted in the machine as hereinafter described and is in its upright position when the ticket has been inserted and the opening impression made. The shaft 75 is, therefore, first rotated in a clockwise direction 180 degrees when the opening impression is being made and is rotated in an anti-clockwise direction 180 degrees when the closing impression is being made, as viewed in Fig. 2. Secured to the shaft 75 is a disk 76 and a pinion 77. The pinion 77 meshes with and drives a pinion 78 secured to a shaft 79 on which is mounted a disk 80 which carries a wrist pin 81. Secured to the wrist pin 81 is a link 82 which is connected to a disk 83 by means of a pin 84. The disk 83 is rotatably mounted on a shaft 85. The distance between the center of the pin 81 and the shaft 79 is less than the distance between the center of the pin 84 and the center of the shaft 85 so that while the disk 80 makes a rotation of 180 degrees the disk 83 will make a rotation of slightly over 90 degrees. The disk 83 is provided with a pin 86 on which is mounted a pawl 87 which is urged towards the five-toothed ratchet 88 by means of a spring 89. A retaining pawl 90 is also provided as is well known in the art. When the opening impression is being made the handle is as before mentioned raised, which rotates the disk 80, as viewed in Fig. 3, 180 degrees clockwise, which moves the disk 83 in a like direction so that the pawl 87 engages the ratchet 88 and rotates it one-fifth of a revolution. The ratchet 88 is secured to the shaft 85 so that the shaft 85 is likewise rotated. A disk 91 provided with five notches is secured to the shaft 85 and integral with this disk is a disk 92 provided with five sets of two teeth, which two teeth are on each side of the notches in the disk 91 thereby forming a Geneva gear which drives a Geneva pinion 93 which drives a pinion 94 secured to the units wheel 95 of the consecutive counter 96, the gearing ratio being such that the units wheel will be driven one-tenth of a revolution each time the handle 68 is moved from its lowermost position to its uppermost position. When being moved from its uppermost position the pawl 87 is pulled over the next tooth of the ratchet 88 and into a position to engage and rotate the same when the handle is moved upwardly.

The printing mechanism is operated by the handle 68. Secured between the disk 80 and the pinion 78 is a cam 97 which when the disk 80 is being rotated clockwise when the handle is being raised engages a cam surface 98 on a lever 99 while when the disk 80 is being rotated anti-clockwise to take the second impression the said cam engages a cam surface 100 on the said lever, in either case moving the lever 99 anti-clockwise as viewed in Fig. 3 and against the tension of a spring 101 secured thereto. The shaft 75 is provided with a semi-circular lug 102 on which normally rests a nose 103 on a lever 104 pivoted on a stud 105. A spring 106 tends to pull this lever downwardly as viewed in Fig. 3. The rearward end of the lever 104 is provided with a notch 107 which receives a projection 108 on the upper end of the lever 99 when the lever 104 has been lowered by the rotation of the lug 102 so that its diametrical part is beneath the nose 103 and the lever 99 has been moved counter-clockwise to its full extent by means of the cam 97. The lever 99 is secured to a shaft 109 to which is secured the lever 110 which has an over-turned arm 111 against the lower end of which rests the platen bar 112 secured to a sleeve 113 rotatably mounted on the shaft 109. A spring 114 connects the platen bar 112 to the lever 110 so as to tend to pull the platen bar against the arm 111. The platen bar 112 carries a heavy bar 115 and on its lower side has a resilient piece of material 116, preferably made of rubber and designed to impart a blow to the ticket to press it against the printing type. By this construction, when the handle is down or in a position such that the ticket may be inserted the shafts 75 and 79 will be in the position 180 degrees removed from that shown in Fig. 3. When the ticket is inserted and the handle is moved upwardly this will rotate the shaft 75 in a counter-clockwise direction, as viewed in Fig. 3, and will rotate the shaft 79 in a clockwise direction. This movement will press the diametrical portion of the lug 102 to the nose 103 of the lever 104 and will allow this lever to be lowered by means of the spring 106 while the cam 97 will engage the cam surface 98 of the lever 99 and will move it outwardly as viewed in Fig. 3 so that the projection 108 on the lever 99 will be engaged in the notch 107 of the lever 104. The cam 97 now moves beyond the lever 99 or into the position shown in Fig. 3 and the lug 102 engages the nose 103 of the lever 104 raising the said lever and releasing the notch 107 from the projection 108 of the lever 99, thereby freeing the said lever. The spring 101 now moves the lever 99 with considerable rapidity in a clockwise direction as viewed in Figs. 3, 7 and 8 so as to impart considerable velocity to the platen bar 112. When the upper end of the lever 99 reaches the shaft 79 it is instantly stopped but the spring allows the platen bar 112 to continue its movement by its inertia so that the resilient material 116 strikes the inserted ticket with a hammer-like blow forcing it against the type wheels. The spring 114 immediately pulls the platen bar 112 upwardly against the arm 111, in which position it remains at rest. When the handle is moved downwardly to take a closing impression the operation is identical with that described above except that the cam 97 engages the cam surface 100 instead of the cam surface 98.

As shown in Fig. 10, a closing impression is made above the opening impression so that the smaller figure could be readily subtracted from the larger. This ticket is inserted manually through an opening 117 in the front plate 16 of the machine. The ticket passes through an opening 118 in the shutter 119 and into a ticket holder 120. This ticket holder is in the shape of an extremely shallow box having one of the sides open as shown in Fig. 5 and is also provided with openings 121 immediately beneath which are positioned the printing type and immediately above which is the platen. The ticket holder is provided with upstanding ears 122 provided with holes which receive a bar 123, which bar is received within bifurcations in the lower end of a bell crank lever 124 rotatably mounted on a shaft 125 to which is secured a tooth 126 on a disk 128, which tooth 126 is received within the notch 127 of the disk 76. When, therefore, the notch 127 engages the disk 126 the disk 128 is rotated until either its surface 129 or 130 reaches the periphery of the disk 76 thereby locking the disk 128 and shaft 125 against further rotation. A spring 131 extends from the bar 123 around the shaft 125 and has its other end resting on top of the shaft 75, the tendency of this spring being to press the ticket holder into its innermost position. A cam 132 is secured to the shaft 75 and is adapted to engage the upper end of the bell crank lever 124 and to actuate the same. The shaft 125 is provided with two arms 133 which project through openings 134 in the shutter 119. The said shutter is provided with a plurality of slots 135 which receive screws 136 which serve as a guide means for the said shutter, the said screws being received in the plates 3 and 4.

As heretofore mentioned, when the ticket is being inserted the handle is in its lowermost position and the shaft 75 is in a position 180 degrees from that shown in Figs. 7 and 8. In this position the outer surface of the cam 132 will be in engagement with the upper end of the bell crank lever 124 so that this lever would be in a position anti-clockwise to that shown in Figs. 7 and 8 so that the ticket holder 120 will be projecting through the opening 118 in the shutter 119 and through the opening 117 in the front plate 16 of the machine, the shutter 119, of course, being in an elevated position. The ticket is now inserted as indicated in Fig. 9, carbon surfaces being provided between the different layers of the ticket in case it is desired to have a manifold ticket. The handle is now raised. As it is raised the cam 132 passes beyond the upper end of the lever 124 so that the spring 131 retracts the ticket holder within the machine. The notch 127 of the disk 76 now engages the tooth 126 of the disk 128 rotating the shaft 125 so that the arms 133 lower the shutter 119 into the position shown in Fig. 8 so that the opening 118 is no longer adjacent the opening 117 of the casing or the open end of the ticket holder 120 thereby rendering the ticket inaccessible and preventing the insertion of a screw driver, wire or other instrument which might damage the machine. After the ticket has been thus pulled into the machine the opening printing impression is made, which would be the line of figures shown in Fig. 10. When it is desired to take a closing impression the handle is moved upwardly. As soon as it commences its rotation the notch 127 of the disk 76 engages the tooth 126 of the disk 128 rotating the shaft 125 so that the arms 133 elevate the shutter 119 to a position adjacent the open end of the ticket holder 120 and the opening 117 in the casing. The cam 133 then engages the upper end of the bell lever 124 rotating it in a counter-clockwise direction, as viewed in Fig. 8, and projecting the ticket holder outwardly through the slots 118 and 117 and immediately thereafter the platen bar is actuated to take the closing impression, which would be immediately above the opening impression as shown in Fig. 10, the ticket holder having been displaced outwardly since the first impression was made. The ticket is now in a position where it may be grasped by the operator and removed from the machine.

The object of the three lugs 70, 71 and 72 on the handle is as follows. The casing as shown in Fig. 4 is provided with slots 137. A sleeve 138 is mounted on a sleeve 139 secured to the shaft 75. The sleeve 139 carries two radially extending lugs 140. These lugs 140 extend within the slots 137 as shown in Fig. 4 and also within slots 141 in the sleeve 139. The slots 141 are located in the sleeve 139 180 degrees apart while a slot 142 in the sleeve 139 is spaced midway between the slots 141, or 90 degrees from each of them. The handle can be inserted or removed only when it is in its upright position. To insert it the lugs 70 and 72 would pass through the slots 137 and engage the outer end of the lugs 140 pressing the sleeve 139 inwardly against the tension of the spring 143 while the lug 71 would engage the slot 142. After the handle has been fully inserted it can be moved downwardly but after it has once started its movement it cannot be removed because the lugs 70, 71 and 72 would engage the inside of the casing and prevent the same. This condition would continue to exist while the handle was in its lowermost position and until it had again been moved into its upright position, at which time it can be removed and in fact if the operator releases his grip thereon, the spring 143 will forcibly eject it. When it is removed or ejected the lugs 140 will engage the slots 137 in the casing and thereby hold the shaft 75 against any rotation.

I have also provided a full stroke mechanism so as to compel the complete movement of the handle in either of its directions before it can be rotated in the opposite direction. The sleeve 139 is provided with a ratchet 144 which might be referred to as a full stroke ratchet, which ratchet is engaged by one or the other of pawls 145 or 146 which are pulled towards each other and towards the ratchet by means of a spring 147. These pawls are mounted on studs 148 and 149 respectively which extend through slots 150 and 151 respectively of a shifting plate 152. This shifting plate is also provided with a slot 153 which receives a bolt 154 secured to the plate 4. Interposed between the bolt 154 and the plate 152 is a friction cup washer 155. Secured to the ratchet 144 is a cam 156 (Fig. 12). One side of this cam consists of a straight surface as shown in dotted lines in Fig. 12 and the other side of it follows the delineation of the right-hand portion of the ratchet 144 as shown in said figure. The shifting plate 152 is provided with an upstanding lug 157 which is adapted to be engaged on one or the other sides thereof by the straight face of the cam 156 and be shifted either to the right or left as viewed in Fig. 12, the friction cup washer 155 retaining it in its shifted position. The parts in Fig. 12 are shown in the position in which they would be if the handle were in its upright position. If now the handle is rotated counter-clockwise the straight edge of the cam 156 would move around and engage the left-hand end of the lug 157 and shift the plate 152 to the right. The plate 152 is provided with two slots 158 and 159 which receive studs 160 and 161 respectively. If the shifting plate 152 is moved from the position shown in Fig. 12 towards the right, the stud 160 would engage the left-hand end of the slot 158 and as the plate 152 continued movement the pawl 145 would be disengaged from the ratchet while the pawl 146 would be engaged therewith. When the handle was thrown in the opposite direction the reverse action would take place. It is, therefore, obvious that when the operator has commenced to rotate the handle he must complete this rotation before he can move the handle back in the opposite direction.

I realize that many changes may be made in the specific form of this invention shown and described by way of illustration in this application and I, therefore, reserve the right to make such changes in the specific form of the invention as shown herein as I may find to be desirable. I, therefore, claim the invention broadly except as I may limit myself by the appended claims.

Having now described my invention, I claim:

1. In a register, a card holder initially in card receiving position, a printing mechanism, an operating handle, means whereby when the handle is initially operated the holder will be retracted so as to render it inaccessible, and when the handle is moved back to its normal position the holder will be moved into its initial position, and means whereby the printing mechanism is operated by the operating handle when the card holder has been moved into each of its two positions.

2. In a register, a card holder adapted to be moved into either of two positions, the holder when in one position being in card receiving position and being moved towards the center of the register in its other position, a printing means to print on the card in the holder, means to actuate the printing means when the card holder is moved into either of its positions, and means to move the card holder into either of its positions.

3. In a register, a card holding means, a cam actuated means to move the said card holding means into card receiving position, a spring to retract the holding means into said register when the cam actuating means is not operated, and means to print on the card in the holding means when the holding means is moved into either of its positions.

4. In a register, a card holding means adapted to be moved into either of two positions in one of which positions the card holding means is wholly within the register and in the other position the card holding means is in card receiving position, a printing means, a common operating means for the printing means and the card holder moving means, and means whereby printing means is rendered effective to print on the card in the holding means when the card has been moved into either of its two positions.

5. In a register, a card holding means having two positions, in the first of which it is in card receiving position so that a card could be inserted in the holding means, a printing mechanism, means whereby the card holding means is retracted wholly within the register and a print taken on the card in the holding means, and a shutter movable over the mouth of the card holding means as the print is made.

GROVER C. COIL.